United States Patent
Lee

(10) Patent No.: US 10,985,657 B2
(45) Date of Patent: Apr. 20, 2021

(54) SWITCH-MODE POWER SUPPLY OUTPUT COMPENSATION

(71) Applicant: TEXAS INSTRUMENTS INCORPORATED, Dallas, TX (US)

(72) Inventor: Sangwoo Lee, Seoul (KR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/844,759

(22) Filed: Dec. 18, 2017

(65) Prior Publication Data

US 2019/0190379 A1     Jun. 20, 2019

(51) Int. Cl.
*H02M 3/158*    (2006.01)
*H02M 3/06*     (2006.01)
*H02M 1/00*     (2006.01)

(52) U.S. Cl.
CPC .......... *H02M 3/158* (2013.01); *H02M 3/06* (2013.01); *H02M 2001/0025* (2013.01)

(58) Field of Classification Search
CPC .... H02M 3/156; H02M 3/158; H02M 3/1588; H02M 2003/1566; H02M 3/155; H02M 3/1582; H02M 2003/1557
See application file for complete search history.

(56) References Cited

U.S. PATENT DOCUMENTS

| | | | | |
|---|---|---|---|---|
| 5,982,160 A | * | 11/1999 | Walters | H02M 3/156 323/222 |
| 7,417,413 B2 | * | 8/2008 | Noma | H02M 3/156 323/284 |
| 7,492,132 B2 | * | 2/2009 | Kuroiwa | H02M 3/156 323/222 |
| 9,729,058 B2 | * | 8/2017 | Larosa | H02M 3/156 |
| 2010/0033145 A1 | * | 2/2010 | Tseng | H02M 3/156 323/282 |

* cited by examiner

*Primary Examiner* — Adolf D Berhane
*Assistant Examiner* — Afework S Demisse
(74) *Attorney, Agent, or Firm* — Mark Allen Valetti; Charles A. Brill; Frank D. Cimino

(57) ABSTRACT

A switch-mode power supply includes a drive transistor, an inductor, and a compensation network. The drive transistor includes a drive transistor current output terminal. The inductor includes an inductor input terminal and an inductor output terminal. The inductor input terminal is coupled to the drive transistor current output terminal. The compensation network is disposed across the inductor. The compensation network is configured to detect voltage drop across the inductor, and to conduct a current from the inductor output terminal to the drive transistor current output terminal.

14 Claims, 3 Drawing Sheets

US 10,985,657 B2

SWITCH-MODE POWER SUPPLY OUTPUT COMPENSATION

BACKGROUND

A switch-mode power supply (SMPS) is an electronic circuit that converts an input direct current (DC) supply voltage into one or more DC output voltages that are higher or lower in magnitude than the input DC supply voltage. An SMPS that generates an output voltage lower than the input voltage is termed a buck or step-down converter. An SMPS that generates an output voltage higher than the input voltage is termed a boost or step-up converter.

A typical SMPS includes a switch for alternately opening and closing a current path through an inductor in response to a switching signal. In operation, a DC voltage is applied across the inductor. Electrical energy is transferred to a load connected to the inductor by alternately opening and closing the switch as a function of the switching signal. The amount of electrical energy transferred to the load is a function of the duty cycle of the switch and the frequency of the switching signal. Switch-mode power supplies are widely used to power electronic devices, particularly battery-powered devices, such as portable cellular phones, laptop computers, and other electronic systems in which efficient use of power is desirable.

SUMMARY

Apparatus for compensating the output of a switch-mode power supply is disclosed herein. In one embodiment, switch-mode power supply includes a drive transistor, an inductor, and a compensation network. The drive transistor includes a drive transistor current output terminal. The inductor includes an inductor input terminal and an inductor output terminal. The inductor input terminal is coupled to the drive transistor current output terminal. The compensation network is disposed across the inductor. The compensation network is configured to detect voltage drop across the inductor, and to conduct a current from the inductor output terminal to the drive transistor current output terminal.

In another embodiment, a buck converter includes stacked switching transistors, control circuitry, an inductor, and a compensation network. The stacked switching transistors include a drive transistor current output terminal. The control circuitry is configured to control switching of the stacked switching transistors. The inductor includes an inductor input terminal coupled to the drive transistor current output terminal, and an inductor output terminal. The compensation network configured to adjust a feedback voltage provided to the control circuitry based on a voltage drop across the inductor. The compensation network includes a sensing network connected to the drive transistor current output terminal and to the inductor output terminal. The sensing network is configured to detect the voltage drop across the inductor.

In a further embodiment, a switch-mode power supply control circuit includes a first driver, a second driver, control circuitry, an inductor drive terminal, an inductor sense terminal, a feedback terminal, and compensation circuitry. The first driver is configured to drive a high-side switching transistor. The second driver is configured to drive a low-side switching transistor. The control circuitry is configured to generate signals that control the switching of the high-side switching transistor and the low-side switching transistor. The inductor drive terminal is configured to connect an input terminal of an inductor to an output node of the high-side switching transistor and the low-side switching transistor. The inductor sense terminal is configured to connect an output terminal of the inductor to the compensation circuitry. The feedback terminal is configured to connect a voltage divider that provides a feedback voltage to the control circuitry. The compensation circuitry is configured to adjust the feedback voltage based on a voltage drop across the inductor. The compensation circuitry includes a sensing network connected to the inductor drive terminal and connected to the inductor sense terminal. The sensing network is configured to detect the voltage drop across the inductor, and induce flow of a current from the feedback terminal to the inductor drive terminal based on the voltage drop across the inductor.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections.

In a switch-mode power supply, such as a buck converter, the output voltage is regulated as a function of a feedback voltage derived from the power supply output voltage. In conventional systems, the feedback voltage may be measured near the load to account for a voltage drop across an output impedance element, such as the conductors over which power is transferred to the load. If the load is distant from the power supply, long conductors (e.g., long printed circuit board traces) may be needed to route the feedback voltage to the power supply. Long conductors can be expensive and difficult to route.

Embodiments of the present disclosure compensate for voltage drop in the power conductors without requiring feedback voltage being measured near the load. Consequently, embodiments eliminate the need for lengthy feedback signal conductors to the power supply circuitry. Rather than requiring feedback of power supply voltage sampled near the load, embodiments of the power supplies and power supply controllers disclosed herein measure the power supply voltage proximate the power supply (e.g., at a load side terminal of a power supply inductor) and adjust the feedback voltage provided to the power supply based on the current flowing in an inductor of the power supply. Sense circuitry coupled to the inductor monitors the voltage drop across the inductor, and adjusts the power supply feedback voltage as a function of the voltage drop. Thus, embodiments disclosed herein compensate for voltage drop in the power conductors by monitoring the currents flowing in the power supply inductor and adjusting the power supply feedback voltage accordingly.

Figure 1:
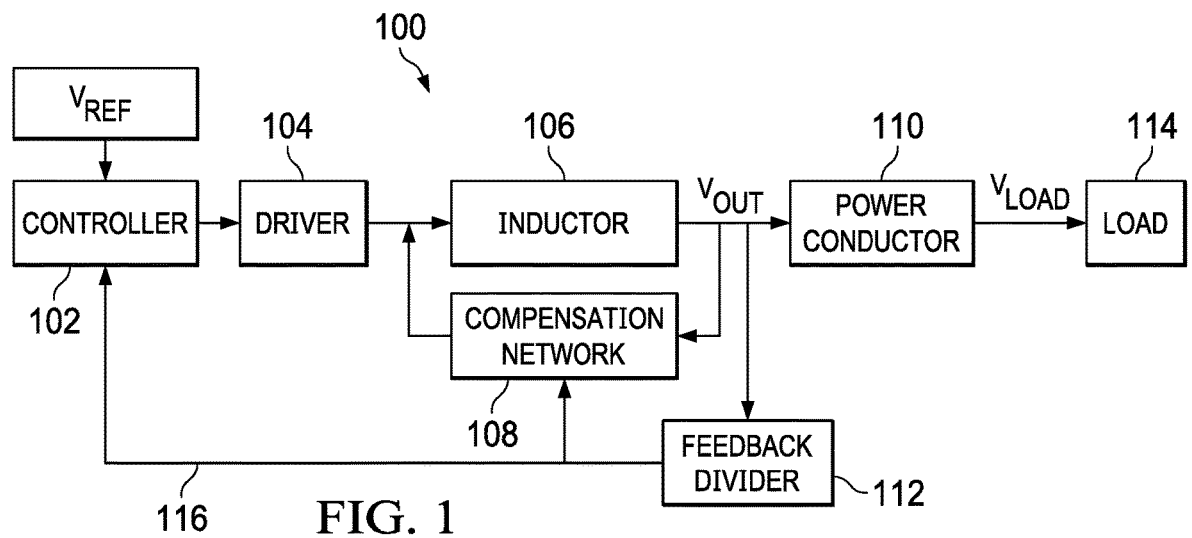
FIG. 1 shows a block diagram of a switch-mode power supply that includes output compensation in accordance with various embodiments.

FIG. 1 shows a block diagram of a switch-mode power supply 100 that includes output compensation in accordance with various embodiments. The switch-mode power supply 100 may be a buck converter. The switch-mode power supply 100 includes a controller 102, a driver 104, an inductor 106, a compensation network 108, and a voltage divider 112. Output of the switch-mode power supply 100 powers a load 114 via a power conductor 110. The load 114 may be an electric or electronic circuit. The power conductor 110 may include a trace or plating formed on a printed circuit board, wiring, or other conductive structures that route power from the inductor 106 to the load 114. The resistance of the power conductor 110 produces a voltage drop at the load 114. Accordingly, the voltage ($V_{LOAD}$) at the load 114 is lower than the voltage ($V_{OUT}$) at an output terminal of the inductor 106.

The controller 102 is an electronic circuit that controls activation and deactivation of the driver 104. For example, the controller 102 may include a pulse width modulation circuit that generates control signals to enable and disable the driver 104 such that a predetermined voltage is maintained at the output terminal of the inductor 106.

The driver 104 includes one or more power switches that switch current from an external power source (e.g., a battery or external power supply) to the inductor 106 under the control of signals received from the controller 102. The energy of the current flow in the inductor 106 is stored as a magnetic field and released when the driver 104 disconnects the inductor 106 from the external power supply.

The voltage divider 112 divides the voltage at the output terminal of the inductor 106 by a predetermined value to produce a feedback voltage 116 that is provided to the controller 102. In some implementations, the controller 102 may attempt to control the driver 104 such that the voltage received from the voltage divider 112 is equal to a reference voltage generated by the controller 102 or provided to the controller 102 by an external reference voltage source ($V_{REF}$, e.g., 1.25 volt output of a bandgap voltage reference). For example, control signals generated by the controller 102 to control switching in the driver 104 may be adjusted to reduce a difference in the reference voltage and the feedback voltage 116 provided by the voltage divider 112.

The compensation network 108 is coupled to an output terminal of the driver 104, an output terminal of the inductor 106, and an output terminal of the voltage divider 112. The compensation network 108 monitors the voltage at the output terminal of the inductor 106 and adjusts the feedback voltage 116 provided to the controller 102 to compensate for voltage drop in the power conductor 110. As the current drawn by the load 114 increases the voltage drop across the power conductor 110 increases. In the switch-mode power supply 100, the voltage divider 112 receives as input the power voltage at the output terminal of the inductor 106, rather than the power voltage near the load 114. Accordingly, the power voltage sampled by the voltage divider 112 does not account for voltage drop in the power conductor 110. For example, a conductor connecting the voltage divider 112 to the inductor 106 may be connected directly to a load side terminal of the inductor 106 so that voltage drop across the power conductor 110 does not affect the voltage at the voltage divider 112.

The compensation network 108 adjusts the feedback voltage 116 to correct for the sampling of the higher voltage at the output terminal of the inductor 106. The compensation network 108 senses voltage drop caused by the internal resistance (see FIG. 2, resistance 208) of the inductor, where the voltage drop increases as the load current (i.e., the current drawn from the switch-mode power supply 100 by the load 114) increases. The compensation network 108 applies the sensed voltage drop to adjust the feedback voltage 116 as a function of the load current. By adjusting the feedback voltage as a function of the load current, the compensation network 108 can correct for voltage drop in the power conductor 110 without requiring that the power voltage be sampled at or near the load 114. Thus, the compensation network 108 allows for a reduction in the length of conductors needed to operate the switch-mode power supply 100. That is, the switch-mode power supply 100 may include no feedback conductors that provide feedback of voltage reduced by drop across the power conductor 100. Rather feedback voltage is provided directly from the load terminal of the inductor 106 and compensation for voltage drop in the power conductor 110 is provided by the compensation network 108.

Figure 2:
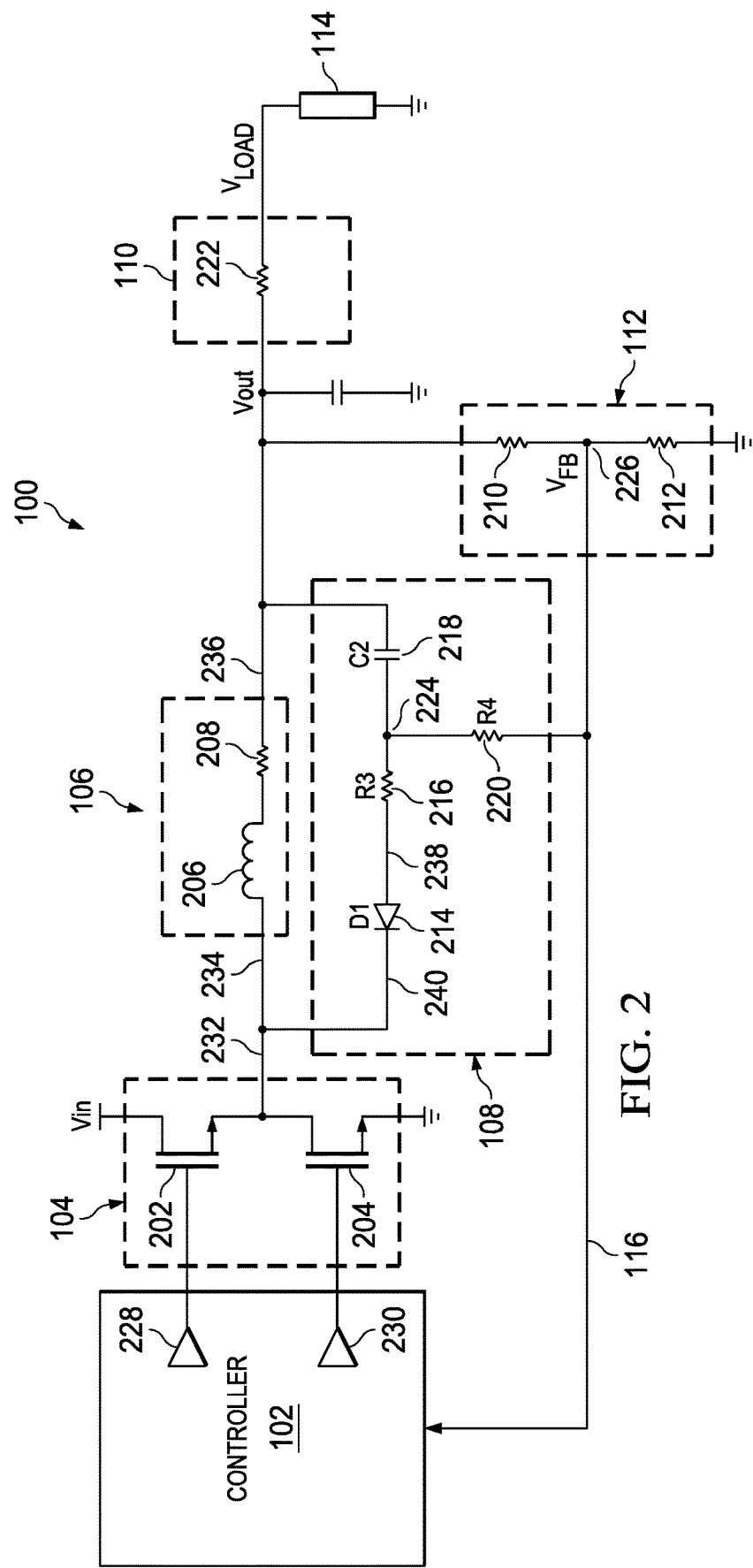
FIG. 2 shows a schematic diagram of a switch-mode power supply that includes output compensation in accordance with various embodiments.

FIG. 2 shows a schematic diagram of the switch-mode power supply 100 in accordance with various embodiments. The schematic of FIG. 2 includes the components shown in FIG. 1 and provides additional detail. The driver 104 includes stacked switching transistors that include a high-side drive transistor 202 (also referred to herein as a "high-side switching transistor") and a low-side drive transistor 204 (also referred to herein as a "low-side switching transistor"). The high-side drive transistor 202 and the low-side drive transistor 204 may be N-channel metal oxide semiconductor transistors (MOSFETs) in some embodiments. The high-side drive transistor 202 is configured to connect the inductor 106 to an external power source via a drive transistor current output terminal 232. The low-side drive transistor 204 is configured to connect the inductor 106 to ground via the drive transistor current output terminal 232. The controller 102 includes gate drivers 228 and 230 that generate gate drive signals that control the operation of the high-side drive transistor 202 and the low-side drive transistor 204.

The inductor 106 includes an inductor input terminal 234, an inductor output terminal 236, inductive component 206 and a resistive component 208. Voltage drop across the inductor 106 is primarily due to the resistive component 208.

The voltage divider 112 includes divider resistors 210 and 212 connected in series. The feedback voltage 116 provided to the controller 102 is generated at the voltage feedback node 226 of the divider resistors 210 and 212.

The power conductor 110 includes resistance 222 that drops power supply voltage between the inductor 106 and the load 114.

The compensation network 108 includes a capacitor 218, a compensation resistor 220, a diode 214, and a compensation resistor 216. The capacitor 218, the compensation resistor 216, and the diode 214 form a sensing network that senses the voltage drop across the inductor 116. The capacitor 218 allows high frequency and/or transient current to flow from the inductor output terminal 236 into the compensation network 108. The diode 214 restricts the direction of current flow in the compensation network 108 to prevent the output pulses generated by the driver 104 from directly affecting the feedback voltage 116. The diode 214 includes an anode terminal 238 and a cathode terminal 240. The voltage at the node 224, the connection point of the capacitor 218 and the compensation resistor 216, decreases as the current drawn by the load 114, and the voltage across the inductor 106, increases. The compensation resistor 220 establishes a voltage between the voltage feedback node 226 and the node 224. The difference in the feedback voltage 116 and the voltage at the node 224 induces current flow between the voltage feedback node 226 and the node 224 via the compensation resistor 220. The current flowing from voltage feedback node 226 to node 224 through compensation resistor 220 increases as the voltage at the node 224 decreases. Thus, various implementations conduct current from the inductor output terminal 236 to the drive transistor current output terminal 232 via the compensation network 108.

As a result of the current flow in the compensation resistor 220, the feedback voltage 116 drops, which in turn causes the controller 102 to increase the voltage at the output terminal of the inductor 106. For example, the controller 102 may increase the rate or width of pulses driving the high-side transistor 202 to produce an increase in the voltage at the output terminal of the inductor 106. Thus, the compensation network 108 monitors current flow in the inductor 106 and, based on the current flow in the inductor 106, adjusts the feedback voltage 116 to cause the controller 102 to compensate for voltage drop in the power conductor 110. The values of the capacitor 218, the compensation resistor 216, and the compensation resistor 220 may be selected to provide an adjustment in the feedback voltage 116 that corresponds to the voltage dropped across the power conductor 110 (as divided by the voltage divider 112).

The capacitor 218 and the compensation resistor 216 are selected to set the voltage at node 224. The values of the capacitor 218 and the compensation resistor 216 may be selected such that under light loading conditions the voltage at node 224 is the same as the voltage at the voltage feedback node 226 to prevent the compensation network 108 from changing the feedback voltage 116 under light load conditions, as the voltage drop across the power conductor 110 is small under light load conditions. The value of the capacitor 218 may be selected based on the switching frequency of the switch-mode power supply 100 as the capacitive reactance of the capacitor 218, in conjunction with the compensation resistor 216, sets the voltage at the node 224. The values of the compensation resistor 216 and the compensation resistor 220 may be selected to allow a maximum of a few microamperes of current to flow from the voltage feedback node 226 through the compensation resistor 220 and the compensation resistor 216. The values of the divider resistors 210 and 212 of the voltage divider 112, current flowing in the voltage divider 112, and the voltage $V_{OUT}$ are considered when selecting the value of the compensation resistor 220 and the compensation resistor 216. In some implementations of the compensation network 108, the capacitance of capacitor 218 may be about 10 nanofarads, the resistance of the compensation resistor 216 may be in a range of about 1 kilohm to 25 kilohms, and the resistance of the compensation resistor 220 may be in a range of about 35 kilohms to 45 kilohms.

Thus, the compensation network 108 provides compensation for the voltage dropped by the power conductor 110 without requiring remote sensing lines. Elimination of remote sensing lines between the load 114 and the switch-mode power supply 100 may simplify signal routing in systems or devices that employ the switch-mode power supply 100.

Figure 3:
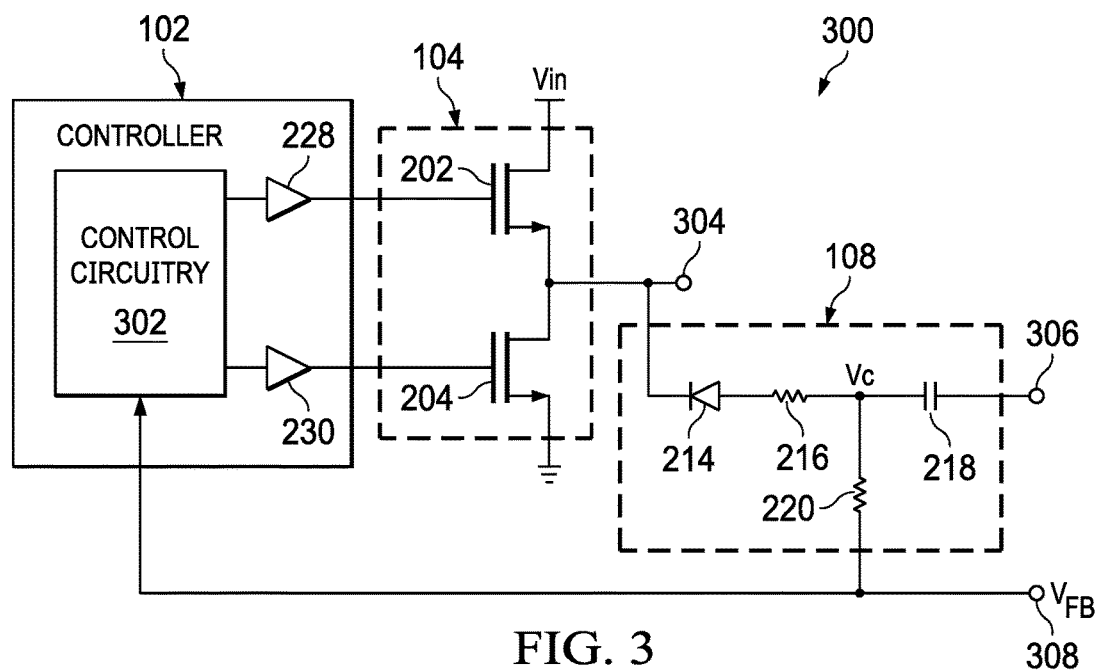
FIG. 3 shows a schematic diagram of a switch-mode power supply control circuit that includes output compensation in accordance with various embodiments.

FIG. 3 shows a schematic diagram of a switch-mode power supply control circuit 300 that includes output compensation in accordance with various embodiments. The switch-mode power supply control circuit 300 includes various components shown in the schematic of FIG. 2. In some embodiments, the components of the switch-mode power supply control circuit 300 may be provided in an integrated circuit.

The switch-mode power supply control circuit 300 includes the controller 102 the driver 104, and the compensation network 108. The controller 102 includes control circuitry 302 that compares feedback voltage to a reference voltage (e.g., output of a bandgap voltage reference) and generates control signals that the gate drivers 228 and 230 apply to the driver 104. Some embodiments of the switch-mode power supply control circuit 300 may include more or fewer components than are shown in FIG. 3. For example, some implementations of an integrated switch-mode power supply control circuit 300 may not include the driver 104 or one or more components of the compensation network 108.

The switch-mode power supply control circuit 300 also includes an inductor drive terminal 304, an inductor sense terminal 306, and a feedback terminal 308. An input terminal of the inductor 106 (the inductor input terminal 234) may be connected to the inductor drive terminal 304, and an output terminal of the inductor 106 (e.g., the inductor output terminal 236) may be connected to the inductor sense terminal 306. The inductor drive terminal 304 is an implementation of the drive transistor current output terminal 232.

The voltage divider 112 (i.e., the voltage feedback node 226) may be connected to the feedback terminal 308 to provide the feedback voltage 116 to the control circuitry 302.

Figure 4:
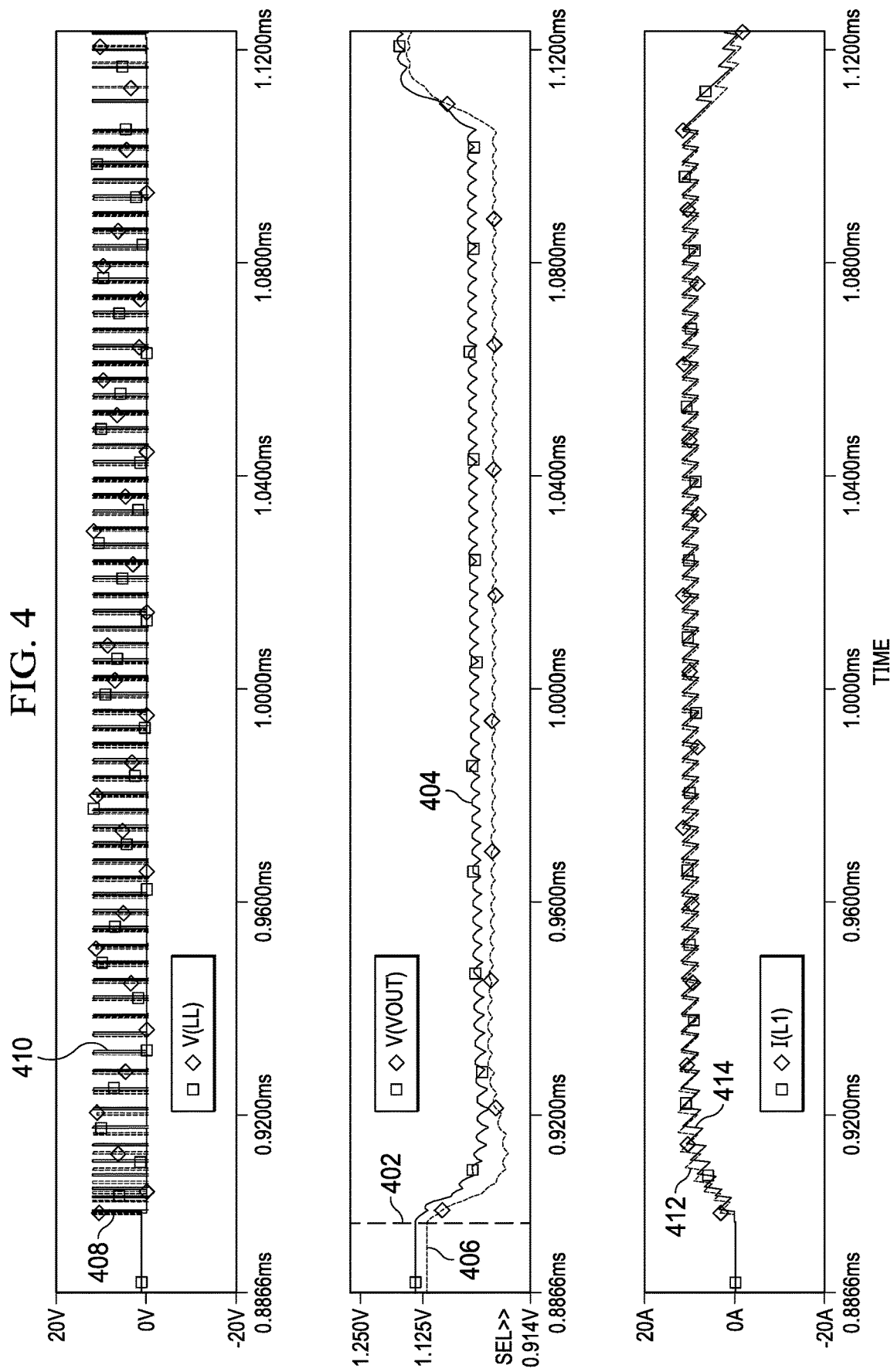
FIG. 4 shows transient performance of a switch-mode power supply that includes output compensation in accordance with various embodiments.

FIG. 4 shows transient performance of the switch-mode power supply 100 in accordance with various embodiments. In FIG. 4, the current drawn by the load 114 increases at 402. Signal 404 represents the voltage output of the switch-mode power supply 100. Signal 406 represents the voltage output of a conventional switch-mode power supply. As shown in FIG. 4, the switch-mode power supply 100 responds to the transient with a higher output voltage than the conventional power supply. Accordingly, the switch-mode power supply 100 provides higher power voltage at the load 114 than the illustrated conventional switch-mode power supply, and voltage at the load 114 is therefore more likely to remain within the power voltage specifications of the load 114.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A switch-mode power supply, comprising:
    a drive transistor comprising a drive transistor current output terminal;
    an inductor comprising:
        an inductor input terminal coupled to the drive transistor current output terminal; and
        an inductor output terminal;
    a feedback path coupled to the inductor output, and having a feedback node; and a compensation network having a current path coupled in parallel to the inductor, the current path having an intermediate node coupled to the feedback node, the current path comprises:
   a capacitor, the capacitor comprising:
      a first terminal connected to the inductor output terminal; and
      a second terminal coupled to the voltage feedback node;
   a first compensation resistor having a first terminal connected to the second terminal of the capacitor and a second terminal coupled to feedback node;
   a second compensation resistor having a first terminal and a second terminal, the first terminal connected to the second terminal of the capacitor; and
   a diode having an anode connected to the second terminal of the second compensation resistor and a cathode connected to the drive transistor current output terminal.

2. The switch-mode power supply of claim 1, wherein the feedback path includes a voltage divider connected to the inductor output terminal, the voltage divider comprising:
   a first divider resistor; and
   a second divider resistor;
   wherein:
      a first terminal of the first divider resistor is connected to the inductor output terminal;
      a first terminal of the second divider resistor is connected to ground; and
      a second terminal of the first divider resistor is connected to a second terminal of the second divider resistor at the feedback node.

3. The switch-mode power supply of claim 1, further comprising:
   a controller having an input coupled to the feedback node and an output coupled to a gate of the drive transistor.

4. A buck converter, comprising:
   stacked switching transistors comprising a drive transistor current output terminal;
   control circuitry configured to control switching of the stacked switching transistors;
   an inductor comprising:
      an inductor input terminal coupled to the drive transistor current output terminal; and
      an inductor output terminal;
   a feedback path coupled between the inductor output terminal and the control circuitry, the feedback path having a voltage feedback node; and
   a compensation network configured to adjust a feedback voltage provided to the control circuitry based on a voltage drop across the inductor, the compensation network comprising a sensing network connected to the drive transistor current output terminal and to the inductor output terminal, the sensing network configured to detect the voltage drop across the inductor
   wherein the compensation network comprises a first compensation resistor coupled to the voltage feedback node and to the sensing network to provide a path for flow of a current from the voltage feedback node to the drive transistor current output terminal.

5. The buck converter of claim 4, wherein the compensation network is configured to conduct a current from the inductor input terminal to the drive transistor current output terminal.

6. The buck converter of claim 4, further comprising a voltage divider network connected to the output terminal of the inductor, the voltage divider network comprising:
   a first divider resistor; and
   a second divider resistor;
   wherein:
      a first terminal of the first divider resistor is connected to the inductor output terminal;
      a first terminal of the second divider resistor is connected to ground; and
      a second terminal of the first divider resistor is connected to a second terminal of the second divider resistor at a voltage feedback node to provide the feedback voltage.

7. The buck converter of claim 4, wherein the sensing network comprises a capacitor, the capacitor comprising:
   a first terminal connected the inductor output terminal; and
   a second terminal coupled to the voltage feedback node through the first compensation resistor.

8. The buck converter of claim 7, wherein the sensing network comprises a second compensation resistor comprising a first terminal coupled to the voltage feedback node through the first compensation resistor and connected to the second terminal of the capacitor.

9. The buck converter of claim 8, wherein the sensing network comprises a diode, the diode comprising:
   an anode terminal connected a second terminal of the second compensation resistor; and
   a cathode terminal connected to the drive transistor current output terminal.

10. The buck converter of claim 8, wherein the first compensation resistor, the second compensation resistor, and the diode provide the path for flow of the current from the voltage feedback node to the drive transistor current output terminal.

11. A switch-mode power supply control circuit, comprising:
   a first driver configured to drive a high-side switching transistor;
   a second driver configured to drive a low-side switching transistor;
   control circuitry configured to generate signals that control the switching of the high-side switching transistor and the low-side switching transistor;
   an inductor drive terminal configured to connect an input terminal of an inductor to an output node of the high-side switching transistor and the low-side switching transistor;
   an inductor sense terminal configured to connect to an output terminal of the inductor;
   a feedback terminal configured for connect a voltage divider that provides a feedback voltage to the control circuitry; and
   compensation circuitry configured to adjust the feedback voltage based on a voltage drop across the inductor, the compensation circuitry comprising a sensing network connected in parallel with the inductor, the sensing network configured to:
      detect the voltage drop across the inductor; and
      induce flow of a current from the feedback terminal to the inductor drive terminal based on the voltage drop across the inductor.

12. The switch-mode power supply control circuit of claim 11, wherein the sensing network comprises:
   a capacitor;
   a first compensation resistor; and
   a diode;
   wherein the capacitor, the first compensation resistor, and the diode are connected in series.

13. The switch-mode power supply control circuit of claim 12, wherein:
- a first terminal of the capacitor is connected to the inductor sense terminal;
- a second terminal of the capacitor is connected to a first terminal of the first compensation resistor;
- a second terminal of the first compensation resistor is connected to an anode terminal of the diode; and
- a cathode terminal of the diode is connected to the inductor drive terminal.

14. The switch-mode power supply control circuit of claim 11, wherein the compensation circuitry comprises a second compensation resistor that connects the sensing network to the feedback terminal.

\* \* \* \* \*